(12) United States Patent
Abu-Saymeh et al.

(10) Patent No.: US 11,553,812 B2
(45) Date of Patent: Jan. 17, 2023

(54) BREWING APPARATUS

(71) Applicant: B/E Aerospace, Inc., Winston-Salem, NC (US)

(72) Inventors: Mudar S. Abu-Saymeh, Olathe, KS (US); Brian P. Mills, Blue Springs, MO (US); Justin D. Jones, Kansas City, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 850 days.

(21) Appl. No.: 16/298,651

(22) Filed: Mar. 11, 2019

(65) Prior Publication Data

US 2020/0288899 A1    Sep. 17, 2020

(51) Int. Cl.
| | | |
|---|---|---|
| A47J 31/00 | (2006.01) | |
| A47J 31/52 | (2006.01) | |
| A47J 31/44 | (2006.01) | |
| B64D 11/04 | (2006.01) | |

(52) U.S. Cl.
CPC ......... *A47J 31/005* (2013.01); *A47J 31/4435* (2013.01); *A47J 31/521* (2018.08); *B64D 11/04* (2013.01)

(58) Field of Classification Search
CPC .... A47J 31/005; A47J 31/521; A47J 31/4435; A47J 31/5255; A47J 31/46; A47J 31/5253; A47J 31/52; A47J 31/5251; A47J 31/4482; A47J 31/4492
USPC .......... 99/275, 279, 280, 283, 295, 297, 299
See application file for complete search history.

(56) References Cited

U.S. PATENT DOCUMENTS

| | | |
|---|---|---|
| 5,094,153 A | 3/1992 | Helbling |
| 6,227,101 B1 | 5/2001 | Rabadi et al. |
| 2011/0052766 A1* | 3/2011 | Knepler .................. A47J 31/52 99/275 |
| 2015/0201795 A1 | 7/2015 | Tinkler et al. |

FOREIGN PATENT DOCUMENTS

| | | |
|---|---|---|
| CN | 101094602 B | 5/2012 |
| CN | 109068886 A | 12/2018 |
| EP | 3094591 B1 | 3/2018 |
| EP | 3326499 A1 | 5/2018 |

OTHER PUBLICATIONS

Extended Search Report for European Application No. 19216294.9 dated Aug. 12, 2020, 7 pages.
Office Action in Chinese Application No. 202010039498.8 dated Aug. 9, 2022, 19 pages (with Translation).

* cited by examiner

*Primary Examiner* — Phuong T Nguyen
(74) *Attorney, Agent, or Firm* — Suiter Swantz pc llo

(57) ABSTRACT

A brewing apparatus may include a chassis. The chassis may include a chassis beverage cup base. A chassis beverage cup cavity defined within the chassis beverage cup base may be configured to receive a beverage cup of a plurality of beverage cups. The brewing apparatus may include an adaptor insert assembly dimensioned to fit within the chassis beverage cup cavity. An adaptor insert cavity defined within the adaptor insert may be configured to receive a second beverage cup of a plurality of beverage cups. The brewing apparatus may include a controller configured to acquire data about the beverage cup or the second beverage cup via the one or more sensors. The controller may be configured to at least one of select or adjust a catering profile of a plurality of catering profiles based on the acquired data.

15 Claims, 9 Drawing Sheets

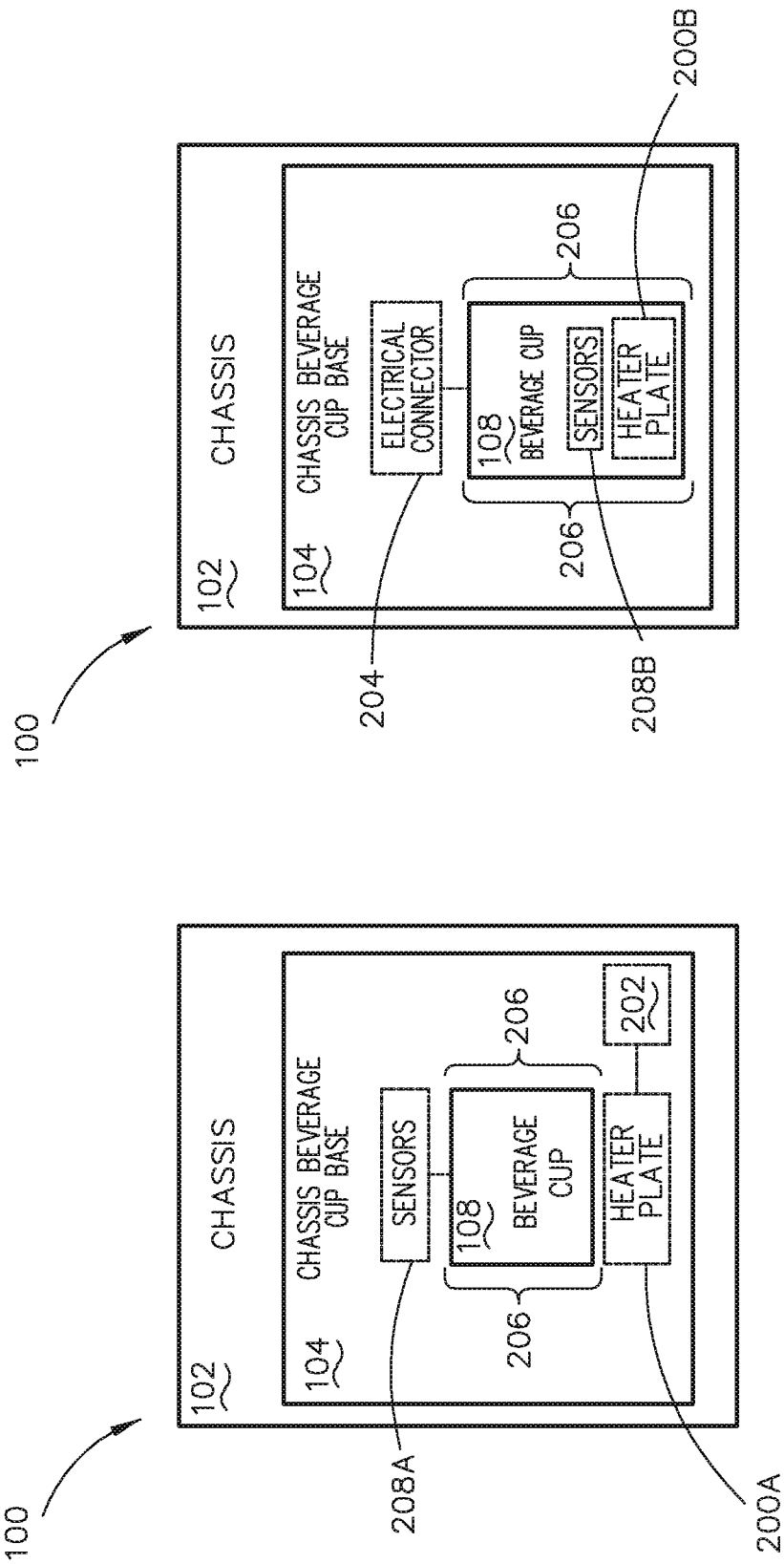

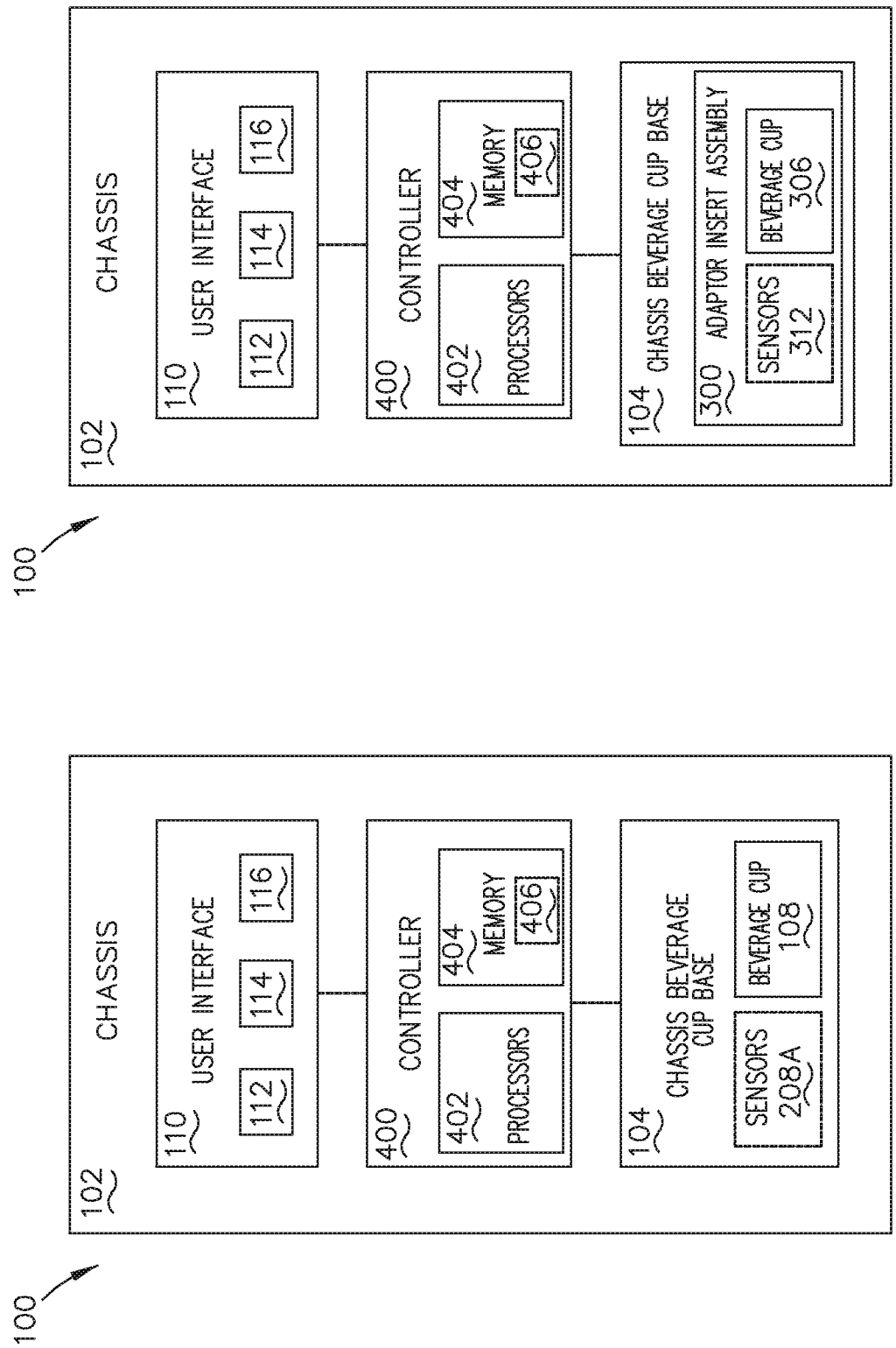

BREWING APPARATUS

BACKGROUND OF THE INVENTION

A brewing apparatus may require a set of select brewing parameters (e.g., a select brewing temperature, a select brewing time when heating, a select size of brewing beverage cup, or the like) for a particular type of brewed beverage (e.g., coffee, espresso, tea, or the like). Deviation from these select brewing parameters may affect the taste and/or quality of the particular brewed beverage.

Select brewing apparatuses known in the art may include a simple catering profile of heating to a set temperature (e.g., either a single temperature or one of three temperatures) and/or heating for a select period of time. In addition, the select brewing apparatuses known in the art may be configured for a particular size of beverage cup (e.g., kettle, server, carafe, single-serving cup, or the like).

In this regard, multiple brewing apparatuses known in the art may be required when brewing multiple different types of brewed beverages, as each of the multiple brewing apparatuses may include a set of select brewing parameters for obtain the correct taste and/or quality of a particular brewing beverage.

SUMMARY

In one aspect, the inventive concepts disclosed herein are directed to a brewing apparatus. The brewing apparatus may include a chassis dimensioned to fit within a compartment of an aircraft galley. The chassis may include a chassis beverage cup base. A chassis beverage cup cavity may be defined within the chassis beverage cup base. The chassis beverage cup cavity may be configured to receive a beverage cup of a plurality of beverage cups. The chassis may include a heater plate. The beverage cup may be positioned proximate to the heater plate when inserted into the chassis beverage cup cavity. The chassis may include one or more chassis sensors configured to acquire data about the beverage cup. The data may include a set of operational parameters for the beverage cup. The brewing apparatus may include a controller in communication with the one or more chassis sensors. The controller may be configured to acquire data via the one or more chassis sensors. The controller may be configured to at least one of select or adjust a catering profile of a plurality of catering profiles based on the acquired data.

In a further aspect, the inventive concepts disclosed herein are directed to a brewing apparatus. The brewing apparatus may include a chassis dimensioned to fit within a compartment of an aircraft galley. The chassis may include a chassis beverage cup base. A chassis beverage cup cavity may be defined within the chassis beverage cup base. The chassis beverage cup cavity may be configured to receive a beverage cup of a plurality of beverage cups. The chassis may include a heater plate. The beverage cup may be positioned proximate to the heater plate when inserted into the chassis beverage cup cavity. The brewing apparatus may include an adaptor insert assembly dimensioned to fit within the chassis beverage cup cavity. The adaptor insert assembly may include an adaptor insert. An adaptor insert cavity may be defined within the adaptor insert. The adaptor insert cavity may be configured to receive a second beverage cup of the plurality of beverage cups. The adaptor insert assembly may include an adaptor insert heater plate. The second beverage cup may be positioned proximate to the adaptor insert heater plate when inserted into the adaptor insert cavity.

In a further aspect, the inventive concepts disclosed herein are directed to a Turkish coffee maker for an aircraft. The Turkish coffee maker may include a chassis dimensioned to fit within a compartment of an aircraft galley. The chassis may include a chassis beverage cup base. A chassis beverage cup cavity may be defined within the chassis beverage cup base. The chassis beverage cup cavity may be configured to receive a Turkish kettle. The chassis may include a heater plate. The Turkish kettle may be positioned proximate to the heater plate when inserted into the chassis beverage cup cavity. The heater plate may be translatable via a translating assembly housed within the chassis. The chassis may include one or more chassis sensors configured to acquire data about the Turkish kettle. The data may include a set of operational parameters for the Turkish kettle. The chassis may include one or more beverage cup restraint assemblies configured to secure the Turkish kettle within the defined beverage cup cavity. The brewing apparatus may include a controller in communication with the one or more chassis sensors. The controller may be configured to acquire data via the one or more chassis sensors. The controller may be configured to at least one of select or adjust a catering profile of a plurality of catering profiles based on the acquired data.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2A is a diagrammatic illustration of an exemplary embodiment of a brewing apparatus, according to the inventive concepts disclosed herein;

FIG. 2B is a diagrammatic illustration of an exemplary embodiment of a brewing apparatus, according to the inventive concepts disclosed herein;

FIG. 4A is a diagrammatic illustration of an exemplary embodiment of a brewing apparatus, according to the inventive concepts disclosed herein;

FIG. 4B is a diagrammatic illustration of an exemplary embodiment of a brewing apparatus, according to the inventive concepts disclosed herein;

DETAILED DESCRIPTION OF EXEMPLARY EMBODIMENTS

Figure 1:
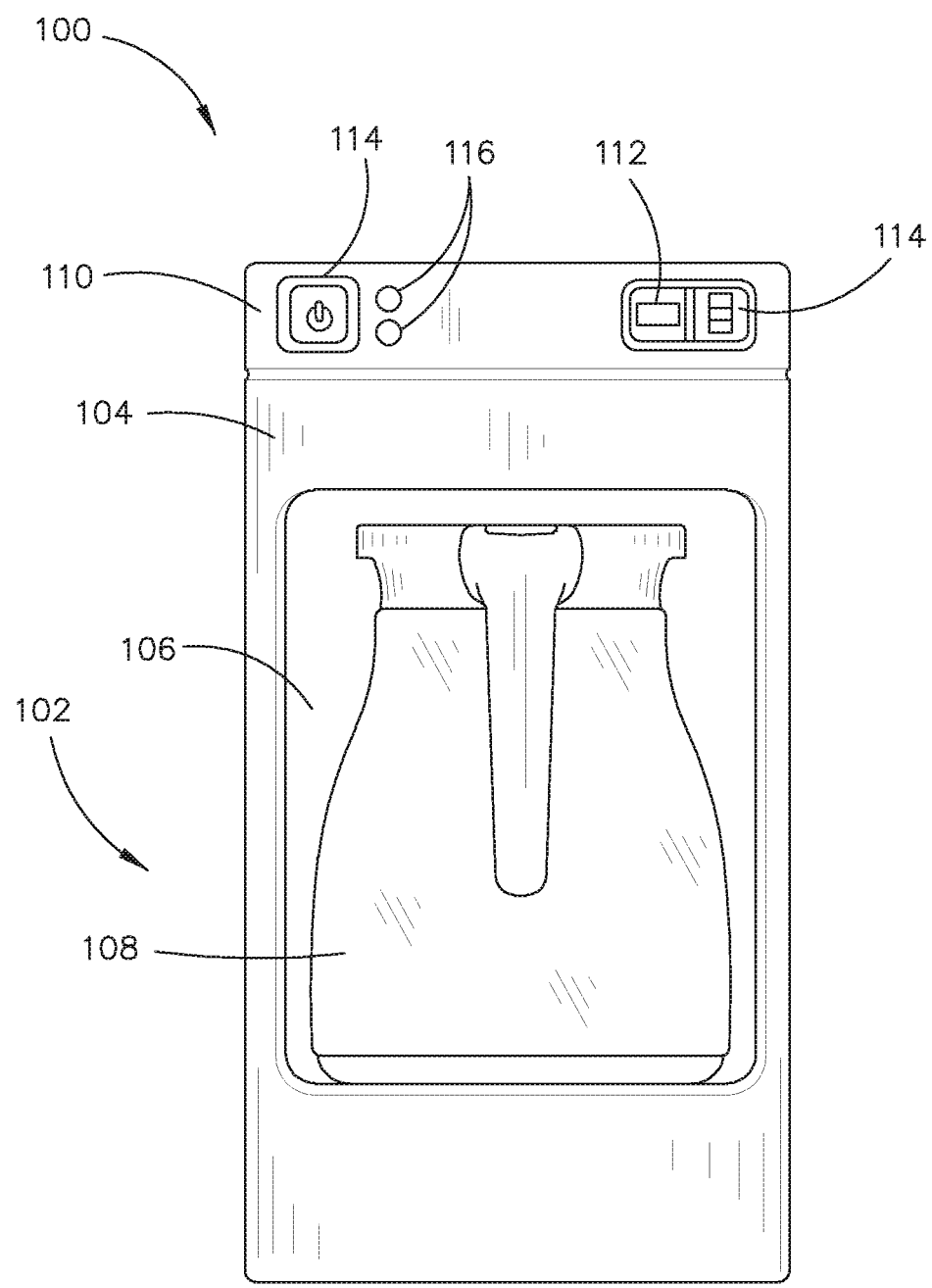
FIG. 1 is a front elevation view of an exemplary embodiment of a brewing apparatus, according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a brewing apparatus. More particularly, embodiments of the inventive concepts disclosed herein are directed to a brewing apparatus, where the brewing apparatus is configured to receive multiple beverage cups and/or adaptor insert assemblies, where the brewing apparatus is further configured to adjust brewing parameters based on a particular received beverage cup and/or a particular received adaptor insert.

FIGS. 1-6C generally illustrate exemplary embodiments of a diagrammatic illustration of a brewing apparatus 100, according to the inventive concepts disclosed herein.

FIG. 1 illustrates a front elevation view of an exemplary embodiment of the brewing apparatus 100, according to the inventive concepts disclosed herein.

The brewing apparatus 100 may include a chassis 102. The chassis 102 may be constructed from one or more chassis sections. Where there are one or more chassis sections, the one or more chassis sections may be coupled together via one or more couplers. For example, the one or more couplers may include, but are not limited to, a fastener, an adhesive, a tongue-and-groove assembly, a tab-and-slot assembly, a friction clip assembly, a latching assembly, or the like. The entire chassis 102 and/or the one or more chassis sections may be fabricated from any plastic or metal known in the art.

The chassis 102 may house one or more components of a brewing system. For example, the brewing system may include one or more heating subsystems with any number of heating components known in the art (e.g., one or more heating elements, one or more heat-resistant components, or the like). By way of another example, the brewing system may include one or more plumbing subsystems with any number of plumbing components known in the art (e.g., fluidic components including one or more pipes and pipe couplers, one or more tubes and tube couplers, or the like). By way of another example, the brewing system may include one or more electrical subsystems with any number of electrical components known in the art (e.g., one or more wire harnesses, one or more terminal blocks, one or more sensors, or the like). It is noted herein the various systems and subsystems within the brewing apparatus 100 may share any number of components.

The chassis 102 may include a chassis beverage cup base 104. A chassis beverage cup cavity 106 may be defined within the chassis beverage cup base 104. The chassis beverage cup cavity 106 may be dimensioned to receive a beverage cup 108. For example, the beverage cup 108 may include, but is not limited to, a kettle, server, carafe, single-serving cup, or other container known in the art capable of holding a heated liquid. It is noted herein the beverage cup 108 may be insulated or non-insulated.

FIG. 2A is a diagrammatic illustration of an exemplary embodiment of the brewing apparatus 100, according to the inventive concepts disclosed herein. Heat may be supplied to the liquid within the beverage cup 108 via a heater plate 200A within the chassis beverage cup base 104. For example, the heater plate 200A may be within the chassis beverage cup cavity 106, such that the beverage cup 108 may sit directly on the heater plate 200A. By way of another example, the heater plate 200A may be underneath the chassis beverage cup cavity 106 and separated via a chassis beverage cup cavity plate, such that the beverage cup 108 may sit directly above the heater plate 200A. For instance, the heater plate 200A underneath the chassis beverage cup cavity 106 may be coupled to a translating assembly 202 (e.g., a translating assembly including one or more linear actuators, one or more linear solenoids, or the like), where the translating assembly 202 translates (e.g., raises or lowers) the heater plate 200A with respect to a bottom surface of the beverage cup 108.

It is noted herein the translation of the heater plate 200A may be manually-controlled (e.g., via a user input device on the brewing apparatus 100). In addition, it is noted herein the translation of the heater plate 200A may be automatic via a controller (e.g., via a set of control signals that adjust the vertical position of the heater plate 200A, where the control signals are generated following a receiving and analyzing of a brew time and/or a brew temperature of the brew within the beverage cup 108). In this regard, heat may be supplied or removed from the beverage cup 108 as desired. It is noted herein that integrating the heater plate 200A into the chassis beverage cup base 104 may allow for a more even heat within the beverage cup 108, with less brew remnant build-up.

FIG. 2B is a diagrammatic illustration of an exemplary embodiment of the brewing apparatus 100, according to the inventive concepts disclosed herein. Heat may be supplied to the liquid within the beverage cup 108 via a heater plate 200B within the base of the beverage cup 108. For example, the heater plate 200B may receive power via one or more electrical connectors 204. For instance, the beverage cup 108 may couple to a power source via an electrical connector 204 within the bottom surface of the beverage cup 108. In addition, the beverage cup 108 may couple to a power source via an electrical connector 204 within the handle (or proximate to the handle) of the beverage cup 108. By way of another example, power may be supplied via an induction plate proximate to the heater plate 200B. For instance, the induction plate may be within the chassis beverage cup cavity 106, such that the beverage cup 108 may sit directly on the induction plate. By way of another example, the induction plate may be underneath the chassis beverage cup cavity 106 and separated via a chassis beverage cup cavity plate, such that the beverage cup 108 may sit directly above the induction plate.

The heater plate 200A, 200B may be configured to at least heat the beverage cup 108 such that a brewed product within the container may be maintained at a selected temperature (e.g., a warming function).

As illustrated in FIGS. 2A and 2B, one or more restraint assemblies 206 (e.g., locking mechanisms, safety catches, or the like) may be configured to engage and/or disengage with the beverage cup 108 within the chassis beverage cup cavity 106. It is noted herein the one or more electrical connectors 204 may provide some amount of safety restraint in addition to or instead of the one or more restraint assemblies 206. The one or more restraint assemblies 206 may include one or more mechanical detents, which may hold the beverage cup 108 in a selected position or orientation until a select amount of force is provided when inserting or removing the beverage cup 108 to overcome the mechanical detent and subsequently engage and/or disengage the one or more restraint assemblies 206.

The chassis beverage cup base 104 and/or the chassis beverage cup cavity 106 may include one or more components configured to determine whether the beverage cup 108 is located within the chassis beverage cup cavity 106 and/or configured to determine whether the beverage cup 108 contains a brewed product from a previous brew cycle.

As illustrated in FIG. 2A, the one or more components may include one or more sensors 208A configured to sense a set of operational parameters of the beverage cup 108 and/or the brewed product within the beverage cup 108. For example, the set of operational parameters may include, but are not limited to, brew temperature, brew time, brew product level within the beverage cup 108, placement of the beverage cup 108, type of beverage cup 108, or the like. It is noted herein that the brewing apparatus 100 may be configured to be non-operational (e.g., a brewing cycle may be non-operable) when the beverage cup 108 is not detected within the chassis beverage cup cavity 106 and/or when a brewed product from a previous brew cycle is detected in the beverage cup 108. In addition, it is noted herein that the one or more components configured to determine whether the beverage cup 108 is located within the chassis beverage cup cavity 106 and/or configured to determine when a brewed product from a previous brew cycle is still in the beverage cup 108 may be integrated into and/or separate from the one or more restraint assemblies 206. For example, the one or more restraint assemblies 206 may include one or more sensors.

In one example, the one or more sensors 208A may include one or more heat-sensing elements coupled to a control device (e.g., a control device integrated within or in communication with a controller 400), where the heat-sensing elements are fixated on the beverage cup 108 and/or the heater plate 200A. In this regard, the chassis beverage cup base 104 may include a thermal protection device.

As illustrated in FIG. 2B, the beverage cup 108 may include one or more sensors 208B. It is noted herein, however, that the one or more sensors 208B may need to be protected from (e.g., be sealed away, or the like) the brewed product and/or cleaning solutions. In this regard, the one or more sensors 208B integrated with the beverage cup 108 may not be affected during removal and washing (e.g., including submersion) of the beverage cup 108.

As described above, embodiments of the present disclosure are directed to the beverage cup 108 being insertable into the chassis beverage cup cavity 106 defined within the chassis beverage cup base 104. In this regard, the chassis beverage cup cavity 106 may be configured to receive a particular beverage cup 108, where the particular beverage cup 108 may be utilized when making a particular type of brewed beverage. However, it is noted herein that the chassis beverage cup cavity 106 may be configured to receive an insert, where the insert is configured to receive a beverage cup that is of a different size than the beverage cup 108.

Figure 3A:
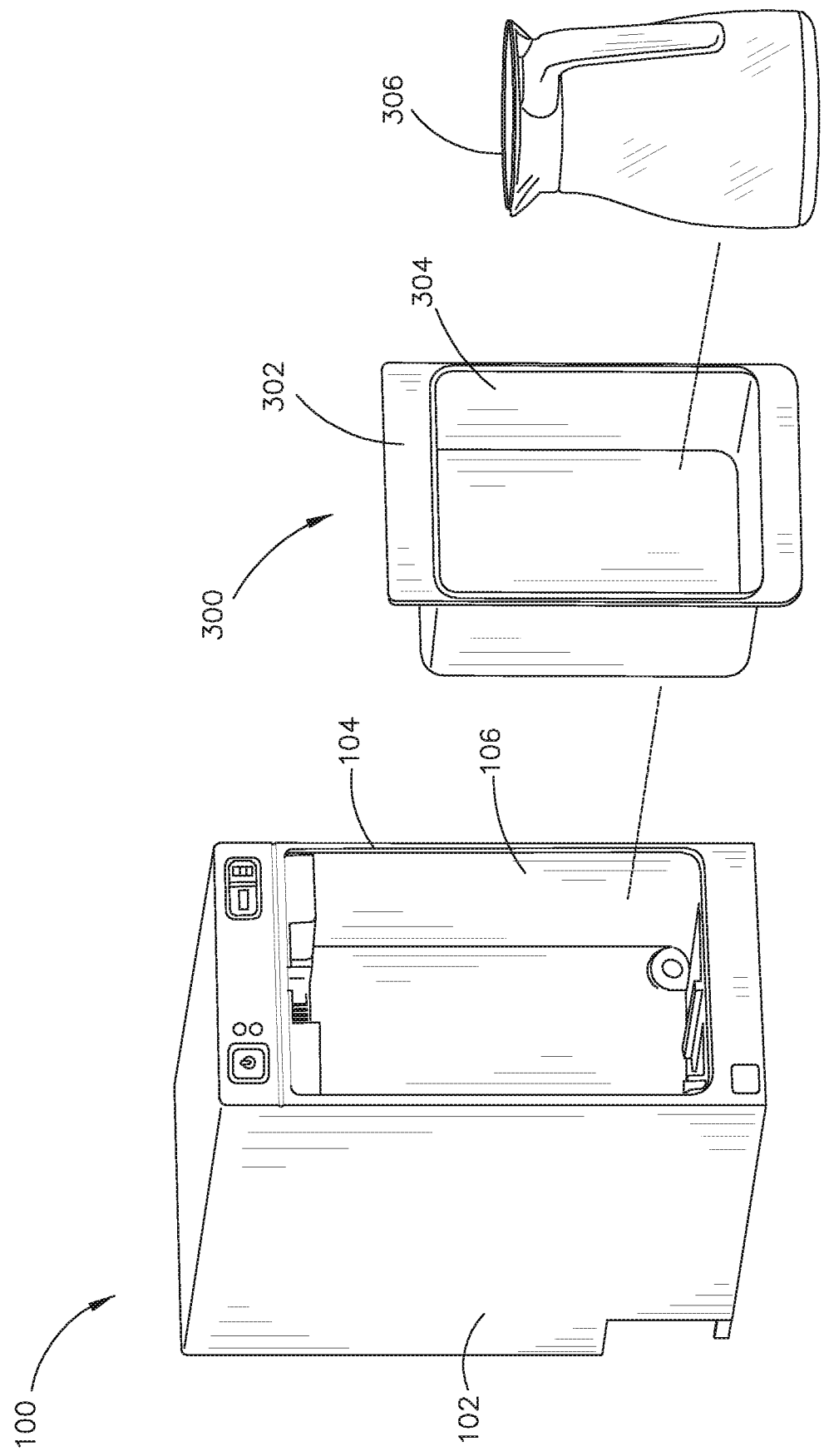
FIG. 3A is an exploded perspective view of an exemplary embodiment of a brewing apparatus, according to the inventive concepts disclosed herein.

FIG. 3A illustrates an exploded perspective view of an exemplary embodiment of the brewing apparatus 100, according to the inventive concepts disclosed herein. The brewing apparatus 100 may include an adaptor insert assembly 300. The adaptor insert assembly 300 may include an adaptor insert 302. The adaptor insert 302 may be mounted within the chassis beverage cup base 104. For example, the adaptor insert 302 may be configured to be inserted into the chassis beverage cup cavity 106. The adaptor insert 302 may couple to the chassis beverage cup base 104 to prevent the adaptor insert 302 from dismounting during operation. For example, the adaptor insert 302 may be configured to couple to the one or more restraint assemblies 206 within the chassis beverage cup base 104. The chassis beverage cup base 104 may include a release assembly to allow for the removal of the adaptor insert 302. For example, the release assembly may be electrically-actuated or mechanically-actuated. In this regard, the existing chassis beverage cup base 104 may be modified to brew a different type of brewed product than the type of brewed product for which the chassis beverage cup base 104 may originally be configured. It is noted herein that different adaptor inserts 302 may modify the existing chassis beverage cup base 104 in different ways. For example, a particular adaptor insert 302 may be configured for a particular brewed beverage or for a particular user of the brewing apparatus 100.

An adaptor insert cavity 304 may be defined within the adaptor insert 302. The adaptor insert cavity 304 may be configured to receive a beverage cup 306. At least one dimension (e.g., outer diameter, inner diameter, volume capacity, contour surface profile, or the like) of the beverage cup 306 may differ from at least one dimension of the beverage cup 108. It is noted herein, however, that the beverage cup 108 and the beverage cup 306 may be the same beverage cup. Therefore, the above description should not be interpreted as a limitation on the present disclosure but merely an illustration.

The beverage cup 306 may be configured to brew a different type of brewed product that the beverage cup 108. It is noted herein, however, that the beverage cup 306 may be configured to brew the same type of brewed product as the beverage cup 108 (e.g., in a different quantity). More generally, it is noted herein that any embodiment directed to the beverage cup 108 may be directed to the beverage cup 306. Therefore, the above description should not be interpreted as a limitation on the present disclosure but merely an illustration.

Figure 3B:
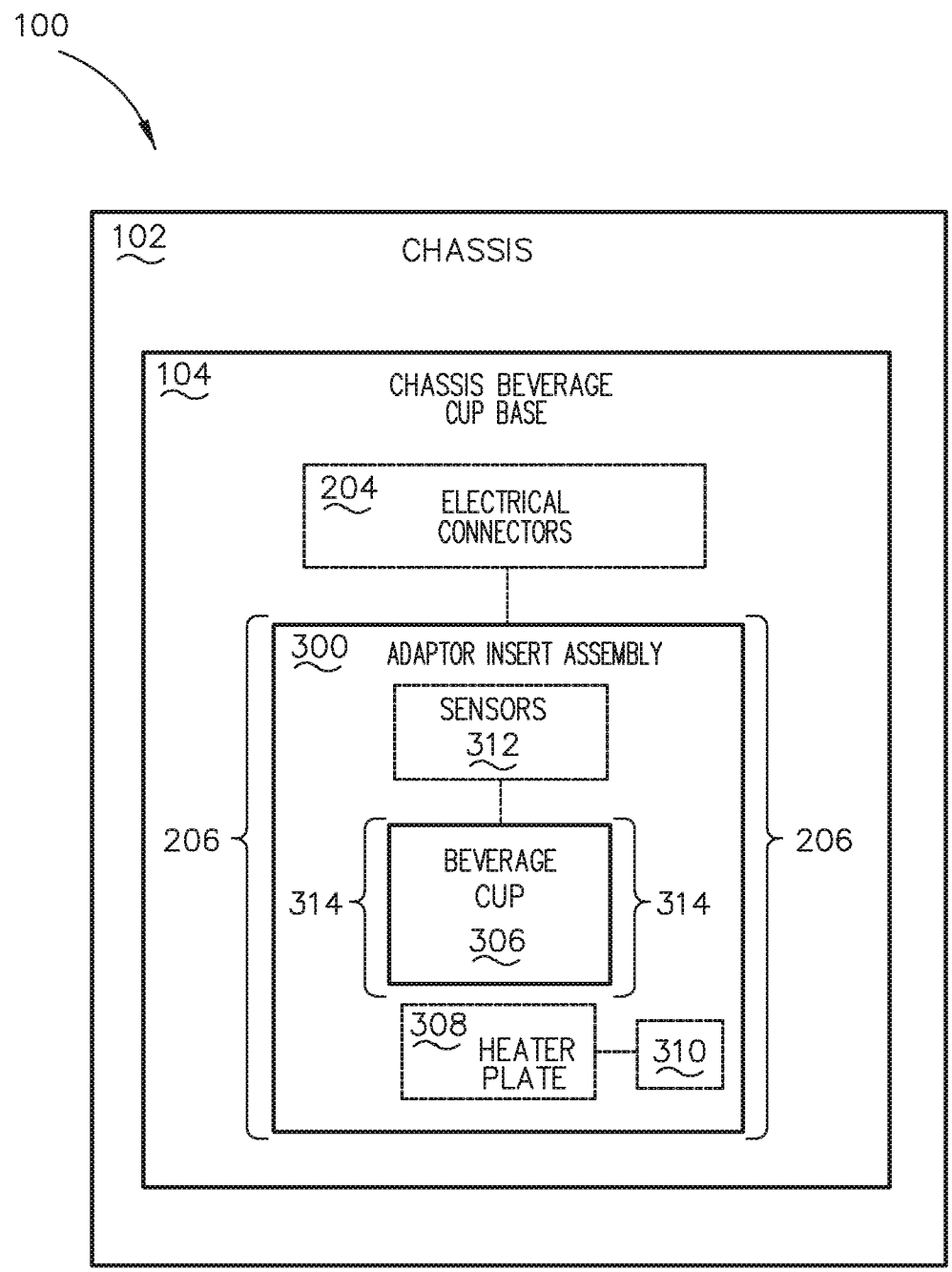
FIG. 3B is a diagrammatic illustration of an exemplary embodiment of a brewing apparatus, according to the inventive concepts disclosed herein.

FIG. 3B is a diagrammatic illustration of an exemplary embodiment of the brewing apparatus 100, according to the inventive concepts disclosed herein. The adaptor insert 302 may include a heater plate 308. Heat may be supplied to the liquid within the beverage cup 306 via the heater plate 308. For example, the heater plate 308 may be within the adaptor insert 302, such that the beverage cup 306 may sit directly on the heater plate 308. By way of another example, the heater plate 306 may be underneath the adaptor insert cavity 304 and separated via an adaptor insert cavity plate, such that the beverage cup 306 may sit directly above the heater plate 308. For instance, the heater plate 308 underneath the adaptor insert cavity 304 may be coupled to a translating assembly 310 (e.g., a translating assembly including one or more linear actuators, one or more linear solenoids, or the like), where the translating assembly 310 raises or lowers the heater plate 308 with respect to a bottom surface of the beverage cup 306.

It is noted herein that integrating the heater plate 308 into the adaptor insert 302 may allow for a more even heat within the beverage cup 306, with less brew remnant build-up. The adaptor insert 302 may couple to the one or more electrical connectors 204 within the chassis server cup base 104, such that the heater plate 308 may receive power via the one or more electrical connectors 204. The heater plate 308 may be dependent on the particular configuration of the adaptor insert 302. For example, the heater plate 308 may be a particular size and/or may be configured to operate at a particular wattage. As such, the integrated heater plate 308 may not be limited to a particular size and/or power constraint. It is noted herein the heater plate 308 may be coupled to a control system (e.g., a controller) and be configured to operate with variable wattages. The heater plate 308 may be configured to at least heat the beverage cup 306 such that a brewed product within the container may be maintained at a selected temperature.

The adaptor insert assembly 300 may include one or more sensors 312 configured to sense a set of operational parameters of the beverage cup 306 and/or the brewed product within the beverage cup 306. For example, the set of operational parameters may include, but are not limited to, brew temperature, brew time, brew product level within the beverage cup 306, placement of the beverage cup 306, type of beverage cup 306, or the like. In this regard, the adaptor insert 302 may allow a user or manufacturer the ability to customize the brewing profile of the brewing apparatus 100, without the need for purchase and/or certification of new brewing apparatus 100.

In one example, the one or more sensors 312 may include one or more heat-sensing elements coupled to a control device (e.g., a control device integrated within or in communication with the controller 400), where the heat-sensing elements are fixated on the beverage cup 306 and/or the heater plate 308. In this regard, the adapter insert assembly 300 may include a thermal protection device.

The adaptor insert assembly 300 may include one or more restraint assemblies 314 (e.g., locking mechanisms, safety catches, or the like) configured to secure the beverage cup 306 within the adaptor insert 302. It is noted herein that any embodiment directed to the one or more restraint assemblies 206 may be directed to the one or more restraint assemblies 314. Therefore, the above description should not be interpreted as a limitation on the present disclosure but merely an illustration.

It is noted herein that the brewing apparatus 100 may be configured to be non-operational (e.g., a brewing cycle may be non-operable) when the beverage cup 306 is not detected within the adaptor insert cavity 304 and/or when a brewed product from a previous brew cycle is detected in the beverage cup 306. In addition, it is noted herein that the one or more components configured to determine whether the beverage cup 306 is located within the adaptor insert cavity 304 and/or configured to determine when a brewed product from a previous brew cycle is still in the beverage cup 306 may be integrated into and/or separate from the one or more restraint assemblies 314. For example, the one or more restraint assemblies 314 may include one or more sensors.

In this regard, the adaptor insert assembly 300 may include, but is not limited to, the adaptor insert 302 with defined adaptor insert cavity 304, the heater plate 308, the one or more sensors 312, and/or the one or more restraint assemblies 314.

Referring again to FIG. 1, the chassis 102 may include a user interface 110. The user interface 110 may be a panel coupled (but otherwise separate from) to a surface (e.g., a front exterior surface) of the chassis 102. It is noted herein, however, that the user interface 110 may be at least partially integrated or embedded within the chassis 102 (e.g., within the front exterior surface of the chassis 102). Therefore, the above description should not be interpreted as a limitation on the present disclosure but merely an illustration.

The user interface 110 may include and/or be configured to interact with one or more display devices 112. The user interface 110 may include and/or be configured to interact with one or more user input devices 114. The user interface 110 may include and/or be configured to interact with one or more indicators 116.

The one or more display devices 112 may include any display device known in the art. For example, the one or more display devices 112 may include, but are not limited to, a liquid crystal display (LCD), a light-emitting diode (LED) display, an organic light-emitting diode (OLED) based display, or the like. Those skilled in the art should recognize that a variety of display devices may be suitable for implementation in the present disclosure and the particular choice of display device may depend on a variety of factors, including, but not limited to, form factor, cost, and the like. In a general sense, any display device 112 capable of integration with the one or more user input devices 114 (e.g., touchscreen, bezel mounted interface, keyboard, mouse, trackpad, and the like) is suitable for implementation in the present disclosure.

In one example, the one or more display devices 112 may include a brew readiness display, a brew parameter selection display, or the like. In another example, the one or more display devices 112 may be a human-machine interface (HMI) configured to provide a user with one or more messages with respect to the operation of the brewing apparatus 100. For example, the one or more messages may include, but are not limited to, status of the brewing cycle (e.g., type of brew, strength of brew, brew temperature, brew time remaining, brew time elapsed, or the like), user prompts (e.g., general operating information, warning messages, or the like), or the like. For instance, where the brewed liquid is coffee, a message about brew time remaining may be utilized by a user of the brewing apparatus 100 to ensure the taste of the brewed liquid is not affected by insufficient or excessive brew time. By way of another example, where the brewing apparatus 100 is installed on a vehicle (e.g., aircraft, or the like), the one or more messages may include, but are not limited to, one or more vehicle operation and/or status updates.

The one or more user input devices 114 may include any user input device known in the art. For example, the one or more user input devices 114 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the present disclosure. For instance, a display device 112 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device 112 is suitable for implementation in the present disclosure.

In one example, the one or more user input devices 114 may include a power button, a brew initiation button, one or more brew parameter selection buttons, one or more buttons configured to control a graphical user interface window displayed in the one or more display devices (e.g., a menu screen), or the like.

In one example, the one or more indicators 116 may be utilized to provide at least one indication of an operational status of the brewing apparatus 100 (e.g., to a user). For example, the one or more indicators 116 may include, but are not limited to, a brew readiness indicator, a water presence indicator, a network availability indicator (e.g., where the brewing apparatus 100 is in communication with a host controller on a vehicle (e.g., an aircraft) or in a building), or the like. The one or more indicators 116 may include, but are not limited to, one or more visual indicators (e.g., one or more lights), one or more auditory indicators (e.g., one or more sounds emitted from a speaker), or the like.

FIGS. 4A and 4B are diagrammatic illustrations of exemplary embodiments of the brewing apparatus 100, according to the inventive concepts disclosed herein. The user interface 110 may be configured to interact with and/or be integrated with a controller 400. For example, the controller 400 may be housed within the brewing apparatus 100. For instance, the chassis 102 may include an access cover to provide access to the controller 400. It is noted herein that one or more components, systems, and/or components of systems (e.g., brewing systems, heating subsystems, plumbing subsystems, electrical subsystems, or the like) of the brewing apparatus 100 may be accessible via the access cover in addition to the controller 400. By way of another example, the controller 400 may be a component external to the brewing apparatus 100. For instance, the controller 400 may be a component of a controller of a vehicle (e.g., an aircraft) in which the brewing apparatus 100 is installed.

The controller 400 may include one or more processors 402 and memory 404. The memory 404 may store one or more databases and/or a set of program instructions 406. The one or more processors 402 may be configured to communicate with the one or more databases (e.g., receive and/or transmit a set of data) and/or execute the set of program instructions 406.

The controller 400 may be configured to receive and/or acquire data or information from components, systems, and/or components of systems (e.g., brewing systems, heating subsystems, plumbing subsystems, electrical subsystems, or the like) of the brewing apparatus 100 by a transmission medium that may include wireline and/or wireless portions. The controller 400 may additionally be configured to transmit data or information to components, systems, and/or components of systems (e.g., the brewing systems, heating subsystems, plumbing subsystems, electrical subsystems, or the like) of the brewing apparatus 100 by a transmission medium that may include wireline and/or wireless portions. In this regard, the transmission medium may serve as a data link between the controller 400 and the systems of the brewing apparatus 100. Additionally, the controller 400 may be configured to send data to external systems (e.g., a controller of a vehicle in which the brewing apparatus 100 is installed) via a transmission medium (e.g., network connection).

In one example, the controller 400 may be configured to recognize a particular beverage cup (e.g., beverage cup 108) having been inserted into the chassis beverage cup base 104, recognize a particular adaptor insert (e.g., adaptor insert 302) having been inserted into the chassis beverage cup base 104, and/or recognize a particular beverage cup (e.g., beverage cup 306) having been inserted into an adaptor insert (e.g., adaptor insert 302). In response to the recognized components, the controller 400 may be configured to provide a different set of options to a user.

It is noted herein that components, systems, and/or components of systems (e.g., the brewing systems, heating subsystems, plumbing subsystems, electrical subsystems, or the like) of the brewing apparatus 100 may be configured to receive and/or transmit data between one another directly (e.g., without the need for an intermediary such as the controller 400). Therefore, the above description should not be interpreted as a limitation on the present disclosure but merely an illustration.

The one or more processors 402 may include any one or more processing elements known in the art. In this sense, the one or more processors 402 may include any microprocessor device configured to execute algorithms and/or program instructions 406. For example, the one or more processors 402 may consist of a vehicle on-board computer, handheld computer (e.g., tablet, smartphone, or phablet), desktop computer, mainframe computer system, workstation, image computer, parallel processor, or other computer system (e.g., networked computer) configured to cause the brewing apparatus 100 to perform one or more of the inventive concepts disclosed herein. It should be recognized that the steps described throughout the present disclosure may be carried out by a single computer system or, alternatively, multiple computer systems. In general, the term "processor" may be broadly defined to encompass any device (e.g., a system on a chip (SOC), a field programmable gate array (FPGA), an application-specific integrated circuit (ASIC), or the like) including one or more processing elements, which execute the one or more sets of program instructions 406 from a non-transitory memory medium (e.g., the memory 404). Moreover, different components, systems, and/or components of systems (e.g., brewing systems, heating subsystems, plumbing subsystems, electrical subsystems, or the like) of the brewing apparatus 100 may include processor or logic elements suitable for carrying out at least a portion of the steps described throughout the present disclosure. Therefore, the above description should not be interpreted as a limitation on the present disclosure but merely an illustration.

The memory 404 may include any storage medium known in the art suitable for storing the set of program instructions 406 executable by the associated one or more processors 402 to carry out the various steps of the inventive concepts disclosed herein. For example, the memory 404 may include a non-transitory memory medium. For instance, the memory 404 may include, but is not limited to, a read-only memory (ROM), a random access memory (RAM), a magnetic or optical memory device (e.g., disk), a magnetic tape, a solid-state drive and the like. The memory 404 may be configured to provide display information to a display device 112 of the user interface 110 and/or the output of the various steps of the inventive concepts disclosed herein. The memory 404 may be housed in a common controller housing with the one or more processors 402. The memory 404 may, alternatively or in addition, be located remotely with respect to the physical location of the processors 402 and/or the controller 400. For instance, the one or more processors 402 and/or the controller 400 may access a remote memory (e.g., server), accessible through a network (e.g., internet, intranet, and the like).

The one or more databases stored within the memory 404 may include one or more pre-programmed catering profiles. For example, a catering profile of the one or more pre-programmed catering profiles may include parameters for a particular brewed beverage including, but not limited to, brew temperature, brew time, type and/or size of beverage cup, or the like. The one or more databases stored within the memory 404 may include data that assists the controller 400 in determining whether the brewing apparatus 100 meets a pre-determined baseline of safe operation. For example, the data may be received from one or more sensors coupled to the components, systems, and/or components of systems (e.g., the heating subsystems, plumbing subsystems, electrical subsystems, or the like) of the brewing apparatus 100. By way of another example, the pre-determined baseline of safe operation may be pre-loaded into the memory 404 prior to operation and/or may be received by the controller 400 during operation.

The set of program instructions 406 may include a set of program instructions 406 configured to cause the one or more processors 402 to receive data from the components, systems, and/or components of systems (e.g., brewing systems, heating subsystems, plumbing subsystems, electrical subsystems, or the like) of the brewing apparatus 100. The set of program instructions 406 include a set of program instructions 406 configured to cause the one or more processors 402 to analyze the received data from components, systems, and/or components of systems (e.g., brewing systems, heating subsystems, plumbing subsystems, electrical subsystems, or the like) of the brewing apparatus 100. The set of program instructions 406 may additionally include a set of program instructions 406 configured to cause the one or more processors 402 to determine an operation state based on the analyzed set of data from components, systems, and/or components of systems (e.g., brewing systems, heating subsystems, plumbing subsystems, electrical subsystems, or the like) of the brewing apparatus 100.

The set of program instructions 406 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the set of program instructions 406 may be configured to operate via proportional control, feedback control, feedforward control, integral control, proportional-derivative (PD) control, proportional-integral (PI) control, proportional-integral-derivative (PID) control, or the like.

In one example, where the brewing apparatus 100 is configured for brewing Turkish coffee, the controller 400 may at least one of recognize a Turkish kettle has been inserted via a beverage cup presence sensor (e.g., of the one or more sensors 208A or the one or more sensors 312) and/or retain the Turkish kettle with one or more restraint assemblies (e.g., a restraint assembly 206 or a restraint assembly 314). In this example, the brewing apparatus 100 may include a one-touch setting (e.g., following a press of a brew button), which operates via a set of program instructions 406 including a pre-programmed catering profile for the Turkish kettle. For instance, the set of programmed instructions may include utilizing at least one of a thermal protection device to monitor temperatures and/or a translating assembly to raise or lower a heater plate when heating a water/coffee mixture to boiling for a first period of time, allowing the water/coffee mixture to cool for a second period of time, and the re-boiling the water/coffee mixture for at least one additional time (e.g., for a third period of time and a fourth period of time, where the brewed beverage is a triple-boil Turkish coffee). In addition, the set of programmed instructions may include sensing an amount or level of the water/coffee mixture via at least one of a beverage cup fluid level detection sensor and/or a beverage cup fluid overflow protection sensor (e.g., of the one or more sensors 208A or the one or more sensors 312). Further, the set of programmed instructions may include sensing a blooming of the coffee as it approaches boiling (e.g., to ensure extraction of the coffee). Further, the set of programmed instructions may control fluid flow within the brewing apparatus 100 via data obtained from a fluid flow meter (e.g., of the one or more sensors 208A or the one or more sensors 312) positioned between the Turkish kettle and a water tank (e.g., housed within the chassis 102 of the brewing apparatus 100), where the fluid flow meter is configured to measure an amount of water dispensed into the Turkish kettle (e.g., in auto-fill versions, one-touch operation versions of the brewing apparatus 100).

By way of another example, the controller 400 may recognize a kettle for a second particular beverage type (e.g., tea, or the like), and may present a user with one or more options (e.g., heating temperature, heating time, catering profile selection, or the like) on the one or more display devices 112 (e.g., an HMI) for selection. In this regard, a particular beverage cup (e.g., beverage cup 108, beverage cup 306, or the like) may be specialized for a particular user need, while being fairly inexpensive relative to the brewing apparatus 100 and interchangeable between brewing apparatuses 100.

It is noted herein the controller 400 may be configured to allow a user to update pre-programmed catering profiles (e.g., calibrate, modify, or the like) and/or generate catering profiles.

Where the brewing apparatus 100 is installed on an aircraft, the controller 400 may be communicatively coupled with an onboard galley network controller of the aircraft. The controller 400 may be configured to transmit and/or receive data from the onboard galley network controller of the aircraft. For example, the controller 400 may be configured to record event logs and may transmit the event logs to the onboard galley network controller. By way of another example, the controller 400 may be configured to receive information and/or commands from the onboard galley network controller, either in response to or independent of transmitted event logs.

Figure 5:
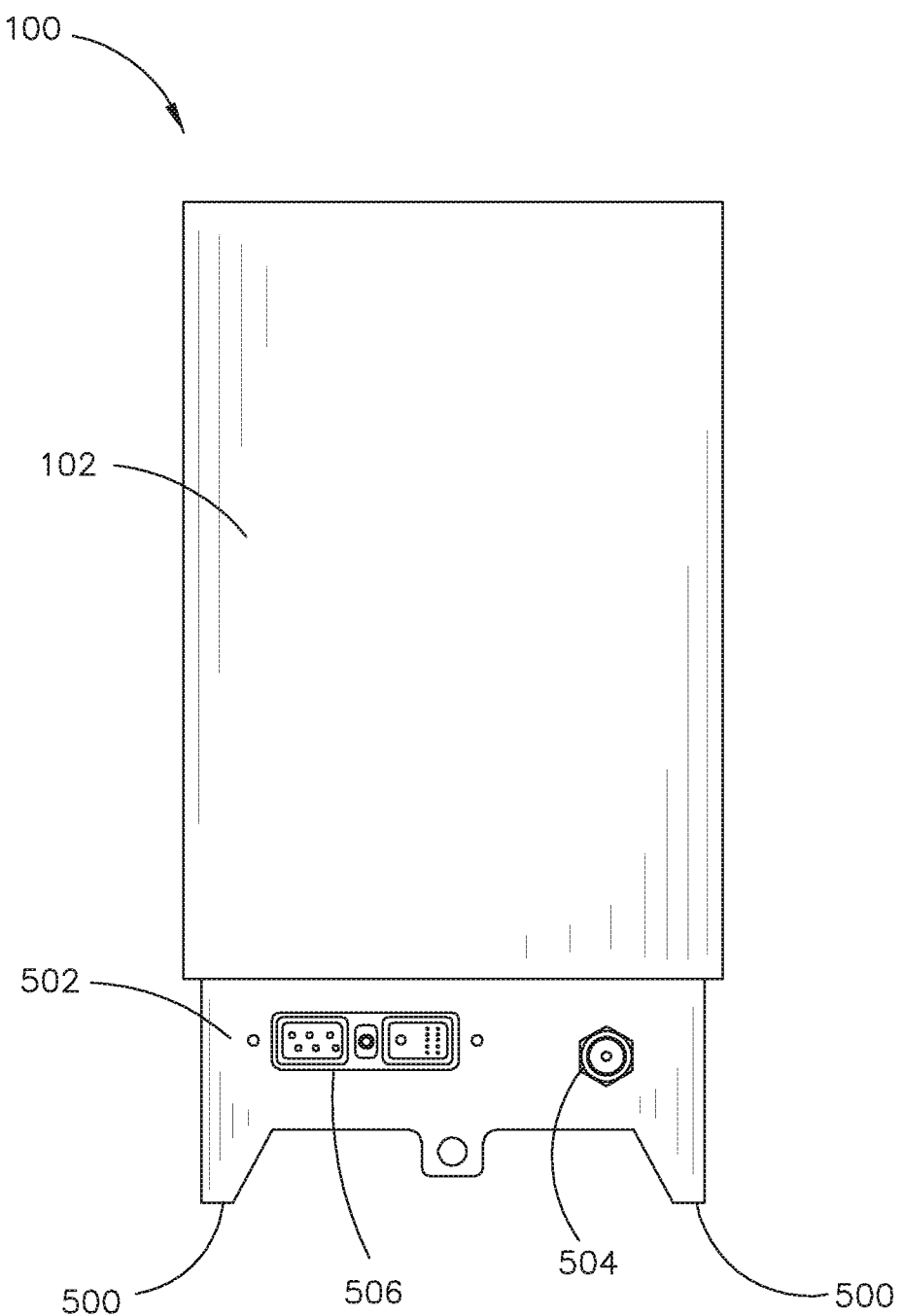
FIG. 5 is a rear elevation view of an exemplary embodiment of a brewing apparatus, according to the inventive concepts disclosed herein.

FIG. 5 illustrates a rear elevation view of an exemplary embodiment of the brewing apparatus 100, according to the inventive concepts disclosed herein. The chassis 102 may include one or more guide rails 500. For example, the one or more guide rails 500 may be configured to engage one or more tracks and secure the brewing apparatus 100 to prevent displacement when a vehicle (e.g., an aircraft, or the like) in which the brewing apparatus 100 is installed is in motion.

The chassis 102 may include a connector plate 502. A drain tube assembly may be routed through the connector plate 502. The connector plate 502 may include one or more fluidic couplers 504. For example, the one or more fluidic couplers 504 may be configured to receive water from storage on the vehicle. By way of another example, the one or more fluidic couplers 504 may be configured to remove waste via one or more draining processes from the brewing apparatus 100. The connector plate 502 may include a power input harness assembly 506 configured to receive power, data, and/or control commands from a vehicle. For example, the power input harness assembly 506 may be 115V, 360-800 Hz compatible. It is noted herein, however, that the power input harness assembly 506 may be compatible with any voltage supplied to the brewing apparatus 100.

Where the vehicle is an aircraft, the power input harness assembly 506 may include one or more data couplers such that the brewing apparatus 100 meets or exceeds select regulations and/or design definitions. For example, the one or more data couplers may be selected to meet or exceed ARINC 812 definitions. It is noted herein, however, that the brewing apparatus 100 may include one or more wireless transmission components instead of or in addition to the one or more data couplers of the power input harness assembly 506. In addition, it is noted herein that the brewing apparatus 100 may not be required to meet any regulations or design definitions. Therefore, the above description should not be interpreted as a limitation on the present disclosure but merely an illustration.

The chassis may include one or more water tanks. The one or more water tanks may be coupled to one or more solenoid valves. For example, the one or more solenoid valves may open or close to allow water to pass through from the one or more water tanks to a specific plumbing subsystem of the brewing apparatus 100. For instance, the brewing apparatus 100 may include a solenoid valve for each plumbing subsystem of the brewing apparatus 100.

The chassis may include a brew cup configured to receive a filter pack (e.g., coffee pillow pack, or the like). A fluid (e.g., water) may flow through the brew cup into a beverage cup (e.g., the beverage cup 108 and/or the beverage cup 306). The brew cup may restrict the flow of heated water, holding a brewing liquid against the filter pack during a brew cycle. It is noted herein, however, that the coffee grounds, tea leaves, or the like utilized when brewing the beverage may be placed directly into the beverage cup (e.g., beverage cup 108, beverage cup 306, or the like). Therefore, the above description should not be interpreted as a limitation on the present disclosure but merely an illustration.

The chassis 102 may include a manifold between the brew cup and the beverage cup. In this regard, the chassis 102 may include one or more additional fluid flow pathways in addition to the fluid flow pathway through the brew cup (e.g., to provide heated water without passing the heated water through a filter pack).

A placard or plate may be coupled to and/or integrated within a surface of the chassis 102. For example, the placard or plate may be coupled to and/or integrated within an exterior surface of the chassis 102. For instance, the placard or plate may be coupled to and/or integrated within a front exterior surface of the chassis 102. The placard or plate may include general information about the brewing apparatus 100 including, but not limited to, one or more manufacturer or consumer logos, one or more informational labels for the brewing apparatus 100 (e.g., either specific to the brewing apparatus 100 or as required by regulations for any similar apparatus), or the like.

Figure 6A:
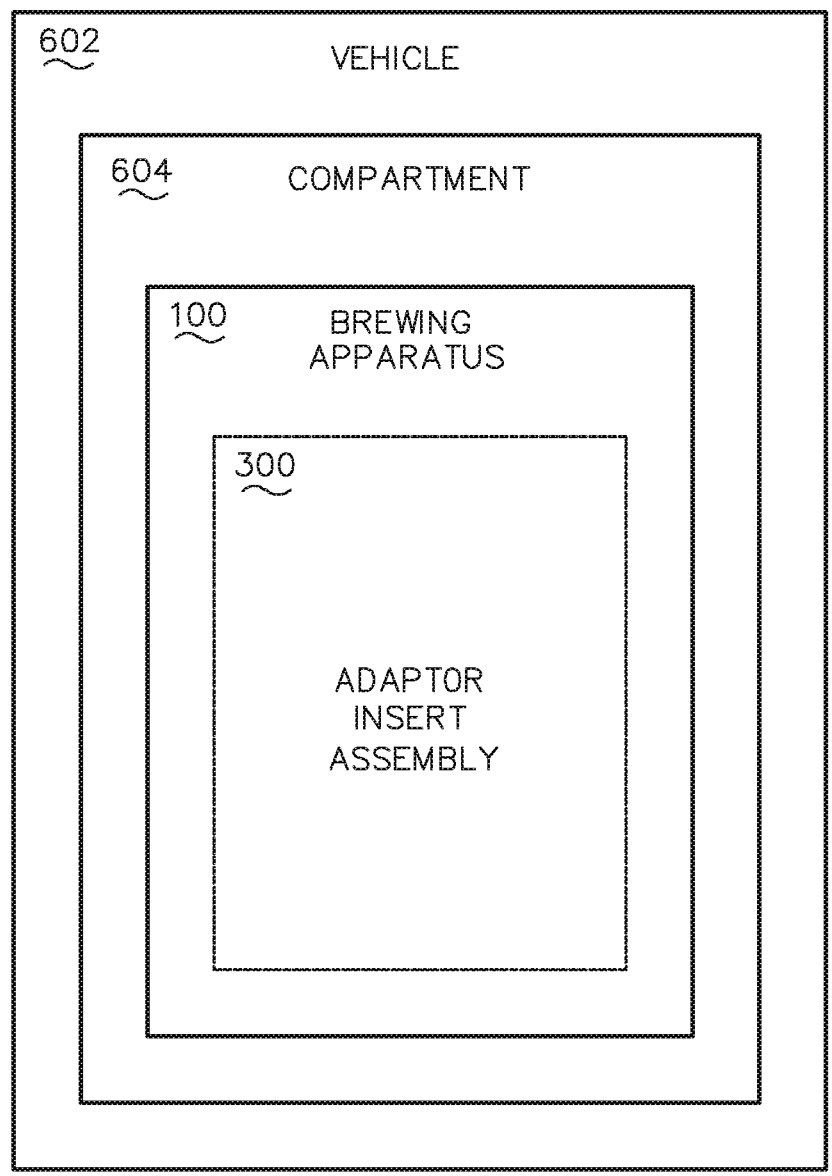
FIG. 6A is a diagrammatic illustration of an exemplary embodiment of a system including a brewing apparatus, according to the inventive concepts disclosed herein.
Figure 6B:
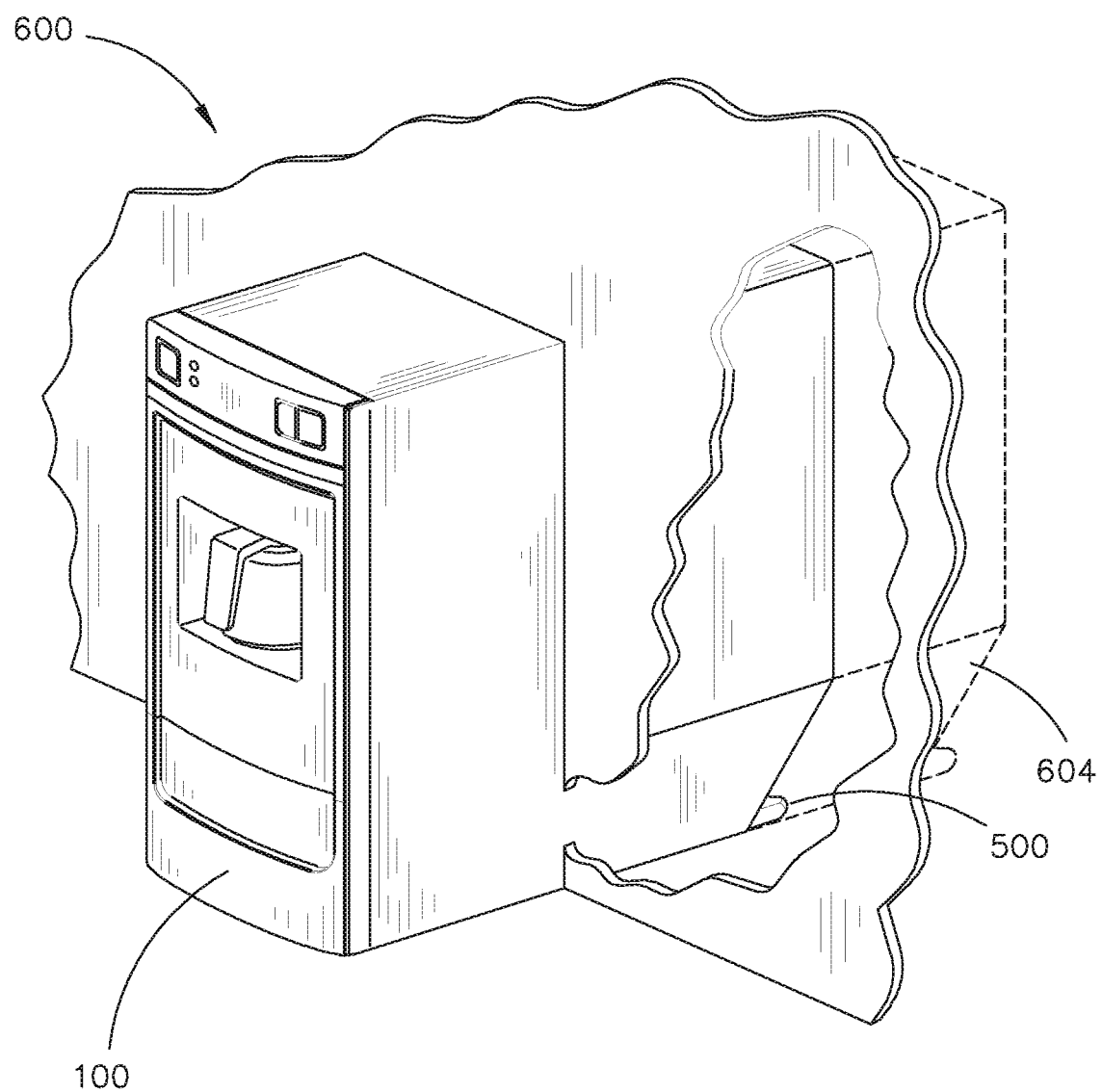
FIG. 6B is a perspective view of an exemplary embodiment of a system including a brewing apparatus, according to the inventive concepts disclosed herein.
Figure 6C:
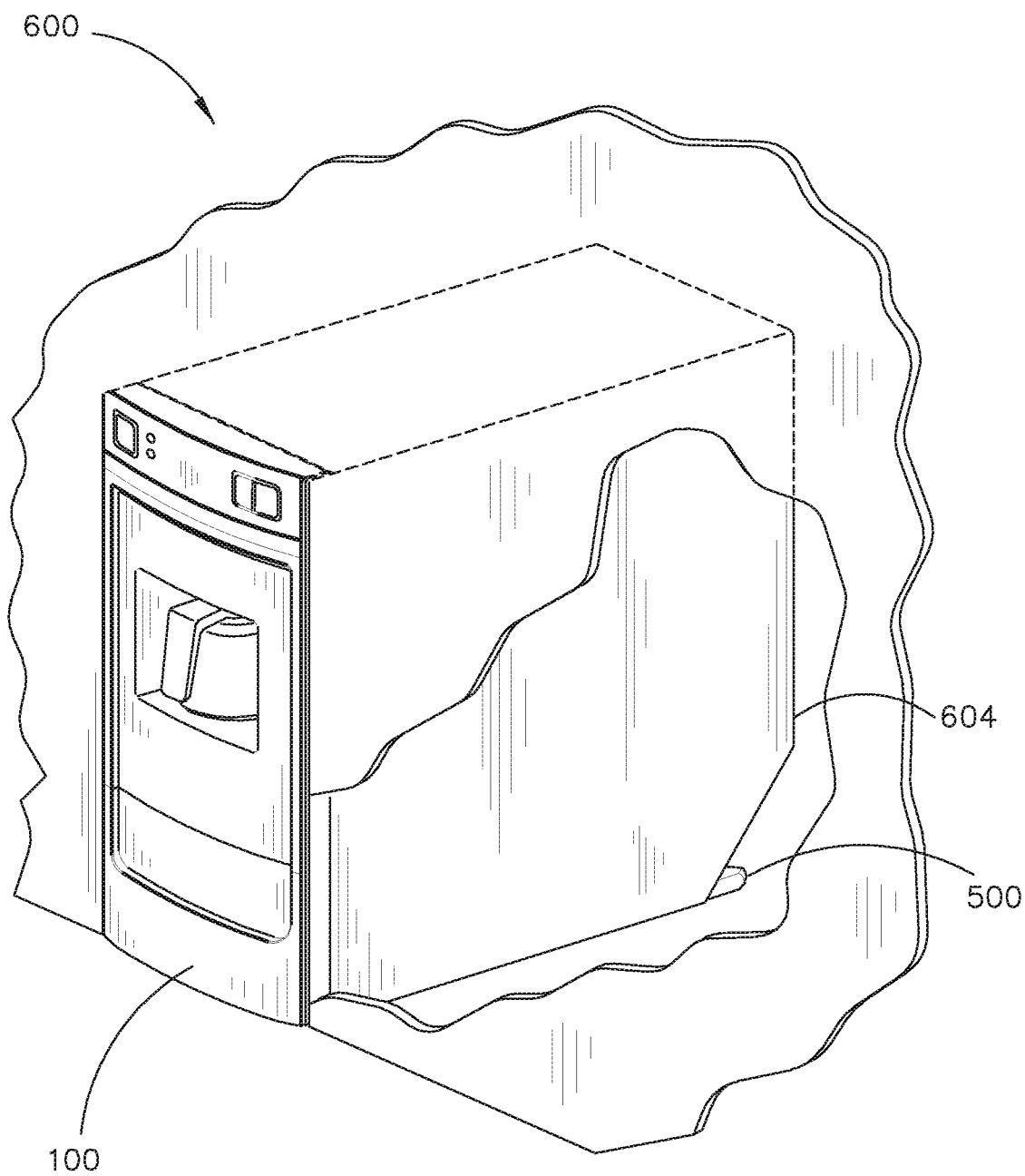
FIG. 6C is a perspective view of an exemplary embodiment of a system including a brewing apparatus, according to the inventive concepts disclosed herein.

FIGS. 6A-6C illustrate a system 600 including the brewing apparatus 100, according to the inventive concepts disclosed herein.

The system 600 may include a vehicle 602. The brewing apparatus 100 may be installed in and/or configured or dimensioned to fit within any type of vehicle 602 known in the art. For example, the vehicle 602 may be any air, land, or water-based personal equipment or vehicle; any air, land, or water-based commercial equipment or vehicle; any air, land, or water-based military equipment or vehicle known in the art. For instance, the vehicle 602 may be a passenger aircraft.

The vehicle 602 may include a compartment 604 in which the brewing apparatus is installed and/or configured or dimensioned to fit. For example, the compartment 604 may include a compartment in a galley of a passenger aircraft.

FIG. 6B illustrates the brewing apparatus 100 as being partially inserted within the compartment 604 of the aircraft galley. It is noted herein that the one or more guide rails 500 of the brewing apparatus 100 may be configured to engage one or more mated slots or tracks within the compartment 604 in the aircraft galley while being inserted into the compartment 604.

FIG. 6C illustrates the brewing apparatus 100 as being fully inserted in the compartment 604 of the aircraft galley. When fully inserted, a front surface of the brewing apparatus 100 may be substantially flush with surrounding aircraft galley compartments, aircraft galley apparatuses, and/or aircraft galley instruments. When the brewing apparatus 100 is fully inserted into the compartment 604, the one or more guide rails 500 may engage corresponding retention locations (e.g., grooves, notches, cavities, or the like) within the compartment 604.

The vehicle 602 may include one or more on-board systems (e.g., water storage reservoirs, water sanitation systems, controllers in communication with the brewing apparatus, or the like) coupled to the brewing apparatus 100. The brewing apparatus 100 may be configured and/or dimensioned to meet or exceed select regulations and/or design definitions. For example, where the vehicle 602 is an aircraft, the design of the brewing apparatus 100 may meet or exceed ARINC 810 definitions. For instance, brewing apparatus 100 may fit within a size 1 galley, which is limited to a 12.5-inch height×7-inch width×12-inch depth footprint. By way of another example, the design of the brewing apparatus 100 may meet or exceed ATLAS definitions. It is noted herein the brewing apparatus 100 and/or select components of the brewing apparatus 100 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. However, it is noted herein that the brewing apparatus 100 may not be required to meet any regulations or design definitions. Therefore, the above description should not be interpreted as a limitation on the present disclosure but merely an illustration.

Although embodiments of the present disclosure are directed to brewed beverages, it is noted herein that the present disclosure may be directed to heated food products including, but not limited to, soups, or the like. Therefore, the above description should not be interpreted as a limitation on the present disclosure but merely an illustration.

Exemplary embodiments of a method, according to the inventive concepts disclosed herein, may include one or more of the following steps and/or sub-steps.

A step may include inserting the beverage cup 108 into the chassis beverage cup cavity 106 of the chassis beverage cup base 104. A step may include acquiring a first set of data (e.g., via the one or more chassis sensors 208A) for the beverage cup 108. A step may include selecting a catering profile of the one or more catering profiles based on the acquired first set of data. A step may include beginning a brewing process based on the selected catering profile. A step may include acquiring at least a second set of data (e.g., via the one or more chassis sensors 208A) for the beverage cup 108 during the brewing process. A step may include adjusting the catering profile based on the acquired at least the second set of data.

A step may include inserting the adaptor insert 302 into the chassis beverage cup base 104. A step may include inserting the beverage cup 306 into the adaptor insert cavity 304 of the adaptor insert 302. A step may include acquiring a first set of data (e.g., via the one or more chassis sensors 312) for the beverage cup 306. A step may include selecting a catering profile of the plurality of catering profiles based on the acquired first set of data. A step may include beginning a brewing process based on the selected catering profile. A step may include acquiring at least a second set of data (e.g., via the one or more chassis sensors 312) for the beverage cup 306 during the brewing process. A step may include adjusting the catering profile based on the acquired at least the second set of data.

A step may include triggering a switch from the catering profile selected for the beverage cup 108 to the second catering profile selected for the beverage cup 306 via one or more of the following sub-steps: removal of the beverage cup 108 from the chassis beverage cup cavity 106 of the beverage cup base 104, insertion of the adaptor insert assembly 300 into the chassis beverage cup cavity 106 of the beverage cup base 104, or insertion of the second beverage cup 306 into the adaptor insert cavity 304 of the adaptor insert 302.

A step may include triggering a switch from the second catering profile selected for the beverage cup 306 to the catering profile selected for the beverage cup 108 via one or more of the following sub-steps: removal of the beverage cup 306 from the adaptor insert cavity 304 of the adaptor insert 302, removal of the adaptor insert 302 from the chassis beverage cup cavity 106 of the chassis beverage cup base 104, and insertion of the beverage cup 108 into the chassis beverage cup cavity 106 of the chassis beverage cup base 104.

It is noted herein the method is not limited to the steps and/or sub-steps provided. For example, the method may instead include more or fewer steps and/or sub-steps. By way of another example, the method may perform the steps and/or sub-steps in an order other than provided. Therefore, the above description should not be interpreted as a limitation on the scope of the present disclosure, but merely an illustration.

As will be appreciated from the above, embodiments of the inventive concepts disclosed herein are directed to a brewing apparatus, where the brewing apparatus is configured to receive multiple beverage cups and/or adaptor insert assemblies, where the brewing apparatus is further configured to adjust brewing parameters based on a particular received beverage cup and/or a particular received adaptor insert.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:
1. A brewing apparatus, comprising:
   a chassis dimensioned to fit within a compartment of an aircraft galley, the chassis comprising:

a chassis beverage cup base, a chassis beverage cup cavity being defined within the chassis beverage cup base, the chassis beverage cup cavity configured to receive a beverage cup of a plurality of beverage cups;

a heater plate, the beverage cup being positioned proximate to the heater plate when inserted into the chassis beverage cup cavity; and one or more chassis sensors configured to acquire data about the beverage cup, the data comprising a set of operational parameters for the beverage cup;

an adaptor insert assembly dimensioned to fit within the defined beverage cup cavity, the adaptor insert assembly comprising:

an adaptor insert, an adaptor insert cavity being defined within the adaptor insert, the adaptor insert cavity configured to receive a second beverage cup of the plurality of beverage cups;

an adaptor insert heater plate, the second beverage cup being positioned proximate to the adaptor insert heater plate when inserted into the adaptor insert cavity; and one or more adaptor insert sensors configured to acquire data for the second beverage cup, the data comprising one or more operational parameters for the second beverage cup, a controller being in communication with the one or more adaptor insert sensors, and the controller in communication with the one or more chassis sensors, the controller configured to:

acquire data via the one or more chassis sensors and the one or more adaptor insert sensors; and at least one of select or adjust a catering profile or a second catering profile of a plurality of catering profiles based on the acquired data.

2. The apparatus of claim 1, the set of operational parameters for the beverage cup comprising:
a placement of the beverage cup within the chassis beverage cup cavity, a plurality of dimensions for the beverage cup, or a brew product level within the beverage cup.

3. The apparatus of claim 1, the set of operational parameters for the second beverage cup comprising:
a placement of the second beverage cup within the adaptor insert cavity, a plurality of dimensions for the second beverage cup, or a brew product level within the second beverage cup.

4. The apparatus of claim 1, the controller configured to:
switch from the catering profile to the second catering profile following insertion of the adaptor insert assembly into the defined beverage cup cavity and insertion of the second beverage cup into the defined adaptor insert cavity; and
switch from the second catering profile to the catering profile following removal of the adaptor insert assembly from the defined beverage cup cavity and insertion of the beverage cup into the defined beverage cup cavity.

5. The apparatus of claim 1, the chassis beverage cup base comprising:
one or more restraint assemblies configured to secure the beverage cup within the defined beverage cup cavity.

6. The apparatus of claim 5, the adaptor insert assembly configured to couple to the chassis beverage cup base via the one or more restraint assemblies.

7. The apparatus of claim 5, the chassis beverage cup base further comprising:
at least one electrical connector configured to couple to the adaptor insert assembly, the heating plate of the adaptor insert assembly configured to receive power via the at least one electrical connector.

8. The apparatus of claim 1, the adaptor insert assembly further comprising:
one or more restraint assemblies configured to secure the second beverage cup within the defined adaptor insert cavity.

9. The apparatus of claim 1, the heater plate being translatable via a translating assembly within the chassis.

10. The apparatus of claim 1, the one or more chassis sensors comprising at least one of a beverage cup presence sensor, a beverage cup fluid level detection sensor, a beverage cup fluid overflow protection sensor, a fluid flow meter positioned in-line between the beverage cup and a water tank housed within the chassis, or at least one heat-sensing element in communication with the controller.

11. The apparatus of claim 1, further comprising:
a user interface in communication with the controller.

12. The apparatus of claim 11, the user interface comprising at least one user input device in communication with the controller,
the controller further configured to:
receive at least one user input from the at least one input device; and
at least one of select or update a catering profile of the plurality of catering profiles based on the received at least one user input.

13. The apparatus of claim 12, the user interface further comprising at least one display device in communication with the controller.

14. The apparatus of claim 13, the controller further configured to:
display a user selection option to a user on the at least one display device;
receive at least one user input from one or more of the at least one user input device or the at least one display device; and
at least one of select or update a catering profile of the plurality of catering profiles based on the received at least one user input.

15. The apparatus of claim 13, the controller further configured to:
display at least one brew parameter of the selected catering profile on the at least one display device, the at least one brew parameter including one or more of a brew temperature or a brew time.

* * * * *